United States Patent
Sinha

(10) Patent No.: US 6,437,535 B1
(45) Date of Patent: Aug. 20, 2002

(54) STARTING SYSTEM AND METHOD FOR A MICROTURBINE POWER GENERATION UNIT

(75) Inventor: Gautam Sinha, Clifton Park, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/617,954

(22) Filed: Sep. 25, 2000

(51) Int. Cl.[7] ............................................... H02P 7/42
(52) U.S. Cl. .................... 318/800; 318/140; 318/700; 318/800; 318/801; 318/802; 318/803; 318/804; 318/805; 318/806; 318/807; 318/808; 318/809; 318/810; 318/811; 318/798; 318/799; 290/40; 290/51; 290/52
(58) Field of Search .................. 318/800–811, 140, 318/700, 798; 290/52, 40, 51

(56) References Cited

U.S. PATENT DOCUMENTS

| | | | |
|---|---|---|---|
| 3,908,130 A | * 9/1975 | Lafuze | 290/46 |
| 4,812,730 A | * 3/1989 | Nakagawa et al. | 318/732 |
| 4,935,684 A | 6/1990 | Watanabe | |
| 5,003,252 A | 3/1991 | Nystrom | |
| 5,350,992 A | * 9/1994 | Colter | 318/807 |
| 5,635,768 A | * 6/1997 | Birch et al. | 290/40 |
| 5,710,699 A | 1/1998 | King et al. | |
| 5,798,631 A | * 8/1998 | Spee et al. | 322/25 |
| 5,903,116 A | * 5/1999 | Geis et al. | 318/140 |
| 5,930,124 A | 7/1999 | Otake | |
| 6,020,713 A | 2/2000 | Geis et al. | |
| 6,023,135 A | 2/2000 | Gilbreth et al. | |
| 6,031,294 A | 2/2000 | Geis et al. | |
| 6,064,122 A | * 5/2000 | McConnell | 290/32 |
| 6,093,975 A | * 7/2000 | Peticolas | 290/52 |
| 6,134,124 A | * 10/2000 | Jungreis et al. | 363/34 |
| 6,147,414 A | * 11/2000 | McConnell et al. | 290/52 |
| 6,169,390 B1 | * 1/2001 | Jungreis | 322/4 |
| 6,175,210 B1 | * 1/2001 | Schwartz et al. | 318/801 |
| 6,184,593 B1 | * 2/2001 | Jungreis | 307/64 |
| 6,281,595 B1 | * 8/2001 | Sinha et al. | 290/40 |

OTHER PUBLICATIONS

U.S. patent application Ser. No. 09/617,955, filed Sep. 25, 2000 Entitled "An Microturbine Based Power Generation System and Method", Attorney Docket No. RD–27,992 by G. Sinha, et al.

* cited by examiner

Primary Examiner—Robert E. Nappi
Assistant Examiner—Tyrone Smith

(57) ABSTRACT

A power electrical system is disclosed for a microturbine power generator. The invention permits the microturbine to be started using an external DC power source. The DC voltage is converted to a variable DC voltage by means of a bi-directional buck-boost circuit, DC bus and a DC-to-AC converter. The DC-to-AC converter produces at its output a fixed voltage pattern whose frequency is gradually increased in concert with the DC voltage, to accelerate the microturbine from standstill to startup speed. Once the microturbine is started, the excitation is discontinued, and the DC bus and DC-to-AC are used to produce output AC power at a voltage level and frequency to match an electrical load.

17 Claims, 2 Drawing Sheets

STARTING SYSTEM AND METHOD FOR A MICROTURBINE POWER GENERATION UNIT

BACKGROUND OF INVENTION

The invention relates to the field of micro-turbines and, in particular, to starting systems for microturbines.

Microturbines are small turbines typically used for on-site power generation. They are generally applied as back-up or auxiliary power sources for office buildings, retail store, small manufacturing plants, homes and many other facilities. These facilities have traditionally been powered by electric utilities via a grid of power distribution lines. Microturbines enable these facilities to generate electrical power at their own sites and thereby avoid being solely dependent on conventional electrical power grids and utilities. Microturbines may also generate power at less cost and/or more reliably than the electrical power provided over the grid by electrical power utilities.

Microturbines require a starter. This starter usually includes a powerful electric machine and a power source for the electric machine, such as a battery. The electric machine may be configured (1) to operate as a motor to start the turbine, and (2) as a generator for a load that is driven by the microturbine once the microturbine has been started. During a start-up phase, the electric machine (operating in motor mode) rotates the microturbine until it has been accelerated to a rotational speed rapid enough to enable the microturbine to operate on its own and drive the electric machine (then operating in generator mode).

A conventional controller for starting a microturbine is disclosed in U.S. Pat. No. 6,020,713 ('713 Patent) that describes a pulse-width modulator (PWM) inverter that operates as an adjustable speed motor drive to start the microturbine. An electrical machine coupled to the PWM inverter is configured as a motor to drive the microturbine during startup and is then configured as a generator that is driven by the microturbine. The PWM inverter described in this '713 Patent varies both the frequency and amplitude of the AC power that it generates to start the microturbine. During a start-up phase of the microturbine, the PWM inverter is powered by a DC bus that is charged to a constant DC voltage. Thus, the PWM inverter is required to convert DC power at constant voltage to variable voltage and variable frequency AC power.

It may not be desirable to rely on a PWM inverter to generate both the variable AC voltage and variable AC frequency needed to start a microturbine. Similarly, it may not be desirable for a single power circuit component, e.g., a PWM inverter, to vary both the frequency and amplitude of the AC power generated to start a microturbine. There is a need for a power circuit for starting a microturbine that does not rely on a PWM inverter to vary both the frequency and voltage of AC power applied to start the microturbine.

Moreover, the voltage applied to the electric machine, when operating in motor mode, must be correlated with the frequency of the applied voltage to maintain the desired flux. This correlation is traditionally accomplished in two steps using two distinct power circuits, i.e. the battery charger and the DC-AC converter (inverter).

There is a need for a power circuit coupled to a microturbine that does not require distinct circuit components for starting and operating a microturbine.

SUMMARY OF INVENTION

The present invention relates to power circuits that start a microturbine and later couple a microturbine to an electrical load. A power circuit generates variable DC voltage which is subsequently converted to AC by another power circuit. The frequency of the AC power generated by the inverter (DC-AC converter) is varied in a controlled manner bearing a fixed relationship with the DC voltage, such that it leads to the acceleration of the microturbine. Accordingly, the AC power applied to start the microturbine has both variable frequency and variable voltage.

In an exemplary embodiment of the invention, a battery provides a source of DC power for starting a microturbine. The constant voltage of the battery is converted by a buck-boost chopper circuit to variable voltage DC power. The buck-boost chopper steps-up the voltage of the DC power through a series of voltage levels that are sequentially applied to drive the microturbine during a start-up phase via the DC-AC converter. The buck-boost chopper applies the variable DC voltage to a capacitive DC bus that distributes the variable DC voltage to other power circuit components. The variable DC power on the DC bus is converted to AC power using a DC-to-AC converter. This converter generates AC power having a variable frequency. The frequency of the AC power is sequentially increased to match (or slightly lead) the desired accelerating starting speed of the microturbine.

The combination of a buck-boost chopper circuit, capacitive DC bus, and a DC-to-AC converter provides a circuit arrangement to start a microturbine. This power circuit arrangement satisfies the need for a power circuit that does not exclusively rely on a PWM scheme to both vary the frequency and voltage of generated AC power applied to start a microturbine.

The invention offers several advantages over prior start-up power circuits including that a single power control circuit component is nor relied on to vary both the frequency and voltage of the AC power applied to start a microturbine. When the voltage waveforms generated at the output of the inverter are of the six-step type, the switching losses are lower. In addition, the control scheme of the present power control circuit can be simplified as compared to the PWM inverter control schemes.

BRIEF DESCRIPTION OF DRAWINGS

Other advantages and novel features of the present invention will become apparent upon review of the following description in conjunction with the accompanying drawings.

DETAILED DESCRIPTION

Figure 1:
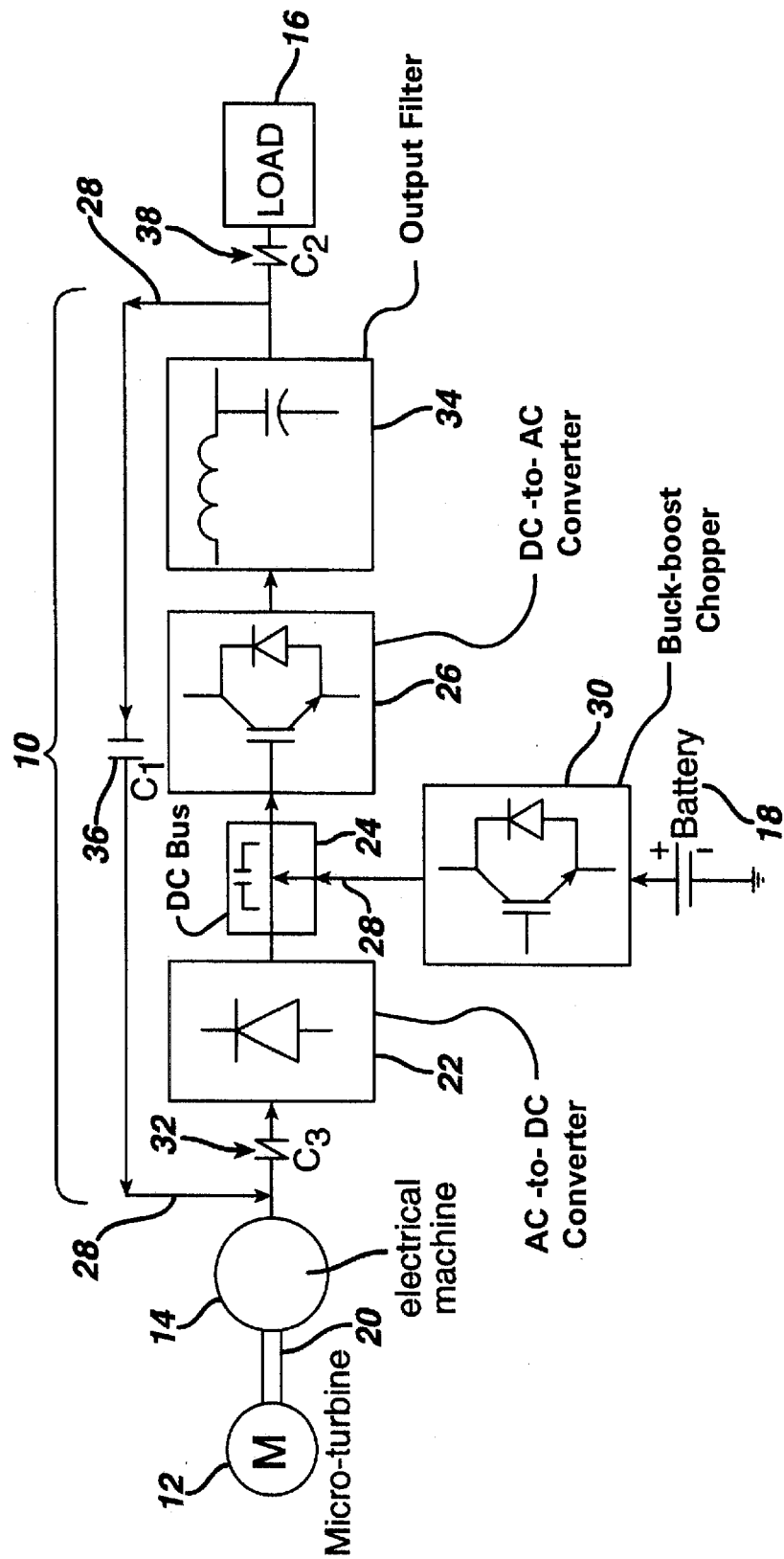
FIG. 1 is an electrical schematic diagram showing a power circuit topology of a microturbine during start-up.

FIG. 1 shows a schematic and block diagram of a power circuit 10 for coupling a microturbine 12 and an electrical machine 14 to an electrical load 16 and to a starting battery 18. The microturbine and electrical machine may share a common rotating output shaft 20 and be formed as an integral unit. Alternatively, the microturbine and electrical machine may be separate units each having a rotating shaft output/input that is coupled to the other. The electrical machine 14 may be configured to operate as a motor to drive the microturbine during a startup phase, and then configured to operate as a generator driven by the microturbine.

A conventional gas microturbine, for example, generally includes a compressor (for natural gas and other fuels), recuperator, a combustion chamber, and the turbine (not shown). A compressor for the microturbine may not be required for other types of fuel, such as diesel. Air is mixed with fuel in the combustion chamber to generate hot, high pressure gases that drive the turbine. The turbine exhaust gases are ducted through the recuperator to transfer heat to the air in the compressor and thereby increase the energy of the air-fuel mixture in the combustion chamber.

Once started, the microturbine operates on its own and produces output power at the output power shaft 20. This shaft drives a rotor (not shown) of the electrical machine 14. The electrical machine may comprise a polyphase, e.g., three- or six-phase, stator winding with the winding output terminals connected to an AC-DC converter 22, e.g. a diode rectifier. The rotor of the electrical machine generally includes a plurality of alternating magnetic poles arranged symmetrically around the axis of the electrical machine. During power generation operation of the microturbine, the magnetic fields emanating from the rotor move through a stator (not shown) of the electrical machine that surrounds the rotor. The stator has a cylindrical aperture sized to receive the rotor. The stator generally includes a plurality of windings and magnetic poles of alternating polarity. When the electrical machine is functioning as a generator, the magnetic fields rotating through the stator produce current in the stator windings. This current is output as electrical power from the electrical machine and is applied by power circuit 10 to the load 16.

The current and voltage produced by the electrical machine is proportional in frequency to the rotational speed of the rotor and the turbine. The load 16 may comprise a polyphased AC electrical power source as well as other residential or commercial single or three phase loads. The power circuit 10 converts the AC power from the electrical machine to AC power that matches the electrical load 16 (typically grid frequency and voltage). For this conversion, the power circuit 10 converts the AC power from the electrical machine 14 to DC power using an AC-to-DC converter 22. Converter 22 may have the provision for an output stage which comprises a boost circuit that converts the uncontrolled DC output voltage to a regulated voltage value higher than the unregulated DC voltage that would have been produced without the boost circuit. The DC output voltage is applied to charge a DC bus 24. The regulated DC voltage value is matched to the AC voltage required by the electrical load 16 by a DC-to-AC converter 26 subject to the constraints imposed by the power circuit component ratings. For instance, a 480 VAC (volts alternating current) output requirement calls for a 800 or a 900 V DC regulated value. The load 16 may comprise an electrical system for a residence, retail store, other commercial establishment or other site requiring electrical power. The load may also include a public utility power grid.

To produce power, the microturbine must first be started by driving the electrical machine 14 as a motor which accelerates the microturbine to a startup speed. Once the turbine reaches the start-up speed, rotation of the microturbine can be sustained without external power. Until the turbine is accelerated to start-up speed, external power is required to rotate the turbine. During start-up, electrical power flows in direction of the arrows 28 to drive the electrical machine 14 as a motor. Power may flow in opposite directions after the microturbine has been started and the electrical machine is producing power.

To start the microturbine, the battery 18 provides a source of direct current (DC) at a substantially constant voltage to the power circuit 10. The battery may comprise a conventional storage cell battery having deep discharge capability to sustain prolonged and repetitive starts. The constant voltage DC power from the battery is converted to variable voltage DC power by a buck-boost chopper 30 connected to the battery. The buck-boost chopper operates as a power stage circuit that steps-up or steps-down, i.e., increases or decreases, the battery voltage level to match the variable voltage requirements for starting the microturbine and permits power flow in and out of the battery. The buck boost chopper 30 may comprise a conventional buck boost chopper circuit component that generally includes a microcontroller that controls the voltage levels output from the chopper circuit. The buck boost chopper may be controlled to sequentially produce DC power at a series of selected voltage levels. The controls for the buck boost chopper circuit may be included in the startup control program that is included with the microturbine.

The sequence of voltage levels generated by the buck boost chopper 30 is selected to match the turbine startup sequence. Specifically, the buck boost chopper 30 may gradually increase the DC voltage through a series of step-wise voltage levels during the startup period of the turbine. The increase in voltage levels is used to drive the electrical machine as it accelerates the microturbine to startup speed. Once the turbine has been started and is generating power, the buck boost chopper 30 converts DC power from the DC bus 24 to a DC voltage level suitable to charge the battery 18.

During the startup phase, the capacitive DC bus 24 distributes the variable voltage DC power produced from the buck boost chopper 30 to DC-to-AC (alternating current) converter 26. The DC bus may comprise a conventional capacitive device commonly used for distributing DC power within a power circuit. The DC bus 24 also distributes DC power from AC-to-DC converter 22, when the electrical machine 14 is producing power. However, during start-up, the AC-to-DC converter 22 is isolated (due to switch contactor C3 32) and performs no function.

During start-up, the DC-to-AC converter 26 converts the variable voltage DC power from the bus 24 to AC power. In one embodiment, the DC-to-AC converter 26 comprises a modified pulse width modulated (PWM) inverter that has been configured to operated as a variable frequency converter rather than as a PWM inverter. During turbine startup phase, the DC-to-AC converter 26 gradually increases the frequency of its output AC power. The converter 26 may include a microcontroller that gradually increases the frequency of the AC power during the startup phase. The rate of increase of the AC frequency is selected to accelerate the electrical machine 14 and microturbine 12 to startup speed. Typically microturbine 12 includes a controller (not shown) with a start up control program loaded therein. The rate of frequency increase produced by DC-to-AC converter 26 may be controlled by the startup control program that is included with the microturbine.

The AC power produced by the DC-to-AC converter 26 may optionally be passed through an output filter 34 to remove extraneous noise or other unwanted fluctuations in the AC power. The AC power from the DC-to-AC converter 26 is routed to the electrical machine 14 which is then driven as a motor. To apply the AC power to the electrical machine excitation contactor 36 (C1) is closed during startup phase, but is open while the microturbine is generating power. During startup, an output contactor switch 38 (C2) is held open to isolate the power circuit 10 and microturbine from the electrical load 16, but is closed while the microturbine 12 generates power so that the AC power produced by the electrical machine 14 can be applied to the load 16. Contactor (C3) 32 is kept open during start up and closed during normal operation.

Figure 2:
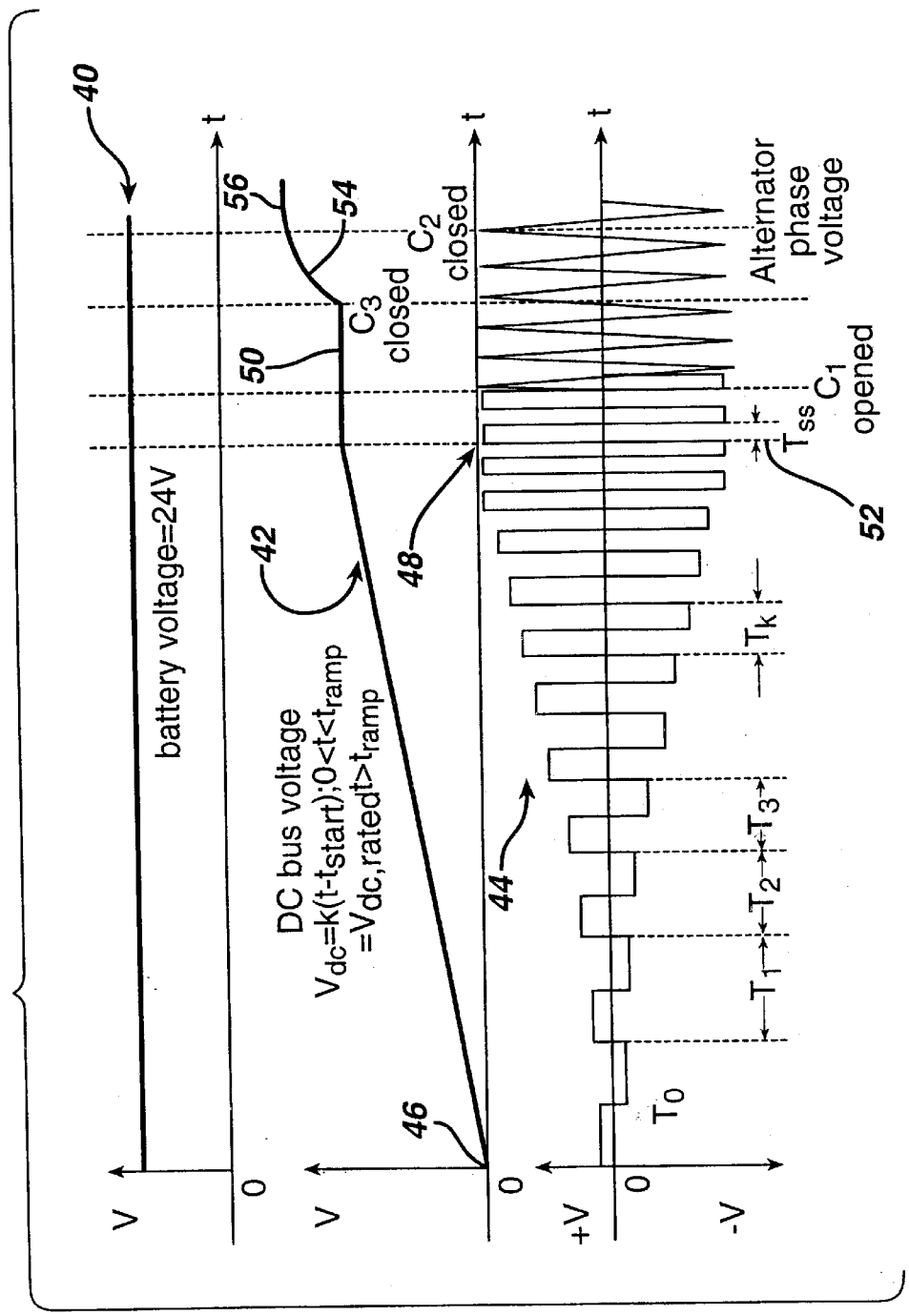
FIG. 2 shows a start-up timing diagram showing an external supply voltage, DC bus voltage and AC startup voltage for the power circuit shown in FIG. 1.

FIG. 2 shows a timing diagram of the conversion of battery power to drive the electrical machine in motor mode, during the microturbine startup phase. The timing diagram shows voltage level (V) as a function of time (t) for the battery 18 (DC voltage 40), the output of the buck-boost chopper 30 (DC voltage 42) and the output of the DC-to-AC converter 32 (AC voltage 44). The timing diagram shown in FIG. 2 relates to the startup phase of the microturbine and, thus, primarily shows the voltage levels that correspond to the startup phase. The voltage levels generated by the microturbine during its power production phase are not generally shown in FIG. 2.

The battery voltage level 40 ($V_{batt}$), e.g., 24 volts, remains substantially constant during the startup phase of the microturbine. The battery voltage level and the battery current are sufficient to drive the electrical machine 14 as a motor in order to start the microturbine. Preferably, the battery is recharged by the electrical machine 14 after the microturbine has been started and produces power.

The buck boost chopper circuit 30 steps-down (or steps up) the constant battery voltage to output a gradually increasing voltage level 42 that is applied to charge the DC bus 24. The voltage level applied by the buck boost chopper circuit 30 to the DC bus gradually increases in accordance with a ramp function that is applied to control the output voltage level of the chopper circuit. The ramp function may be expressed in equation (1) below:

$$VDC = k(t - t_{start}), \text{ when } 0 < t < t_{ramp} \quad \text{(Equation 1)}$$

Where $V_{DC}$ is the voltage level of the DC bus 24, "k" is a constant setting the slope of the ramp function, "t" is time, "$t_{start}$" is time at the beginning of the microturbine startup phase 46, and $t_{ramp}$ 48 is end period during which the DC voltage is being increased during the startup phase.

In the first period of the microturbine startup phase, voltage is applied to drive the electrical machine 14 as a motor. During this first period of the startup phase, the buck boost chopper circuit 30 gradually increases the voltage of the DC bus 24 from zero volts (or some other relatively low starting voltage level) to the DC rated voltage of the ramp 50. This gradual increase in voltage level is performed to match the drive voltage requirements of the electrical machine 14, which is being operated as a motor during the startup phase. During the first period of the startup phase and when the startup time (t) exceeds $t_{ramp}$, the voltage outputs of the buck boost chopper and the DC bus remain at a steady machine 50 that corresponds to the rated voltage of the bus 24. The voltage level on the DC bus remains at this rated machine 50 until the microturbine is started and, thus, ending the first period of the startup phase.

Also during the first period of the startup phase, the DC-to-AC converter 26 (which is functioning as an alternator) converts the DC power from the DC bus to AC power 44 having a gradually increasing frequency. The DC-to-AC converter alternatively inverts the voltage level of the DC bus to produce a series of voltage pulses, where adjacent pulses are inverted. The effect of this series of alternatively inverted pulses is AC power. In addition, the converter is polyphase and will, for example, generate three phases of the AC power that are each identical in voltage level and frequency and off-set in their phases.

The frequency of the AC power 44 is increased in proportion to the increase in the voltage level on the DC bus. Accordingly, the frequency output by the DC-to-AC converter can be controlled by the voltage level on the DC bus, such that as the voltage level on the bus increases the AC frequency will increase proportionally. Accordingly, as the DC voltage increases, the periods ($T_1, T_2, T_3, \ldots T_k$) of the AC voltage cycle are sequentially shortened by the DC-to-AC converter. At $t_{ramp}$, the AC frequency reaches a steady state ($T_{SS}$) 52.

At the end of the first period of the startup phase and when the microturbine has started and is self-sustaining, the excitation contactor 36 is opened to cease operating the electrical machine as a motor. During phase two 54 of the startup phase, the microturbine 12 is operating but is not coupled to the load 16. In phase two, the contactor 32 remains open and the DC bus 24 is still powered by the battery 18.

Shortly after the excitation contactor 36 is opened (during Phase II 54), contactor 32 is closed so that AC power from the electrical machine 14 is applied to converter 22, which converts that AC power to DC power applied to the DC bus. The power from the electrical machine and converted by converter 22 further charges the DC bus to a voltage level 56 that corresponds to the desired no-load operating voltage of the DC-to-AC converter 26. The second period 54 of the startup phase ends, when the DC bus has been charged to the non-load operating voltage level and the output contactor 38 is closed to connect the load 16 to the electrical machine 14.

In order to abort a start-up, in one embodiment, DC-AC converter 26 is disabled and contactor 36 ($C_1$) is opened. Buck-boost chopper 30 then transfers power from DC bus 24 to battery 18.

Although the invention has been described and illustrated in detail, it is clearly understood that the same is by way of example and illustration only and is not to be taken by way of limitation. The terms of the present invention are to be limited only by the terms of the appended claims.

What is claimed is:

1. A method for starting a turbine coupled to an electric machine for supplying power to a load through a DC bus the method comprising, during a startup phase: a. gradually increasing a voltage level of the DC bus; b. converting DC power from the DC bus to AC power such that the frequency of the AC power increases in proportion to the gradually increasing voltage level of the DC bus; c. applying the AC power to drive electric machine, which machine in turn drives the turbine to a starting speed.

2. The method of claim 1 further comprising, after the startup phase, the steps of: d. driving the electric machine with the turbine to generate AC power; e. converting the generated AC power from the electric machine to DC power applied to the DC bus; f. converting the DC power from the DC bus to load-driving AC power, and g. supplying the load-driving AC power to the load.

3. A method for starting a turbine coupled to an electrical machine which in turn is driven by a power circuit including a buck-boost chopper circuit, a DC bus and a DC-to-AC converter, wherein the method comprises the steps of: a. gradually charging the DC bus by gradually increasing a voltage level output of the buck boost chopper; b. during step (a), converting DC power from the DC bus to AC power using the DC-to-AC converter, where the frequency of the AC power increases in proportion to the gradually increasing voltage level output from the buck boost chopper; c. applying the AC power from the DC-to-AC converter to drive electrical machine which drives the turbine during a startup phase.

4. A method for starting a turbine as in claim 3 wherein the electrical machine is driven by the turbine after the startup phase.

5. A method for starting a turbine as in claim 3 wherein the gradual increase of the DC voltage level output of the buck boost chopper is a linear increase.

6. A method for starting a turbine as in claim 3 wherein the gradual increase of the DC voltage level output of the buck boost chopper is controlled by a controller.

7. A method for starting a turbine as in claim 3 wherein the frequency increase of the AC power is controlled by the voltage level of the DC bus.

8. A method for starting a turbine as in claim 3 wherein the turbine is a microturbine.

9. A method for starting a turbine as in claim 3 wherein the turbine is a gas turbine.

10. A system for starting a turbine coupled to an electrical machine which in turn is driven by a power circuit, wherein the power circuit comprises: a buck-boost chopper having a DC power output, where DC power is output at a gradually increasing DC voltage level; a DC bus charged by the gradually increasing DC voltage level; a DC-to-AC converter powered by the DC bus and converting the gradually increasing DC voltage level to AC power, wherein the AC power is applied to drive an electrical machine which drives the turbine during a startup phase.

11. A system for starting a turbine as in claim 10 wherein the electrical machine comprises a motor.

12. A system for starting a turbine as in claim 10 wherein the DC-to-AC converter gradually increases the frequency of the AC power.

13. A system for starting a turbine as in claim 10 wherein the DC-to-AC converter gradually increases the frequency of the AC power in proportion to the increasing DC voltage level.

14. A system for starting a turbine as in claim 10 wherein the turbine is a gas turbine.

15. A system for starting a turbine coupled to an electric machine for supplying power to a load through a DC bus the system comprising: a buck-boost chopper for gradually increasing a voltage level of the DC bus during a startup phase; an AC-to-DC converter for converting generated AC power from the electric machine to DC power and applying the DC power to the DC bus after the startup phase; a DC-to-AC converter for converting DC power from the DC bus to AC power; at least one switch for, during the startup phase, applying the AC power from the DC-to-AC converter to drive electric machine, which machine in turn drives the turbine to a starting speed, and, after the startup phase, applying AC power from the DC-to-AC converter to the load.

16. A system for starting a turbine coupled to an electric machine for supplying power to a load through a DC bus the system comprising, during a startup phase: means for gradually increasing a voltage level of the DC bus; means for converting DC power from the DC bus to AC power; means for applying the AC power to drive electric machine, which machine in turn drives the turbine to a starting speed.

17. The system of claim 16 further comprising: means for, after the startup phase, driving the electric machine with the turbine to generate AC power; converting the generated AC power from the electric machine to DC power applied to the DC bus; converting the DC power from the DC bus to load-driving AC power; and supplying the load-driving AC power to the load.

* * * * *